(12) United States Patent
Andree et al.

(10) Patent No.: US 8,542,915 B1
(45) Date of Patent: Sep. 24, 2013

(54) SYSTEMS AND METHODS FOR COLOR CONVERSION USING INTELLIGENT BOUNDARY POINT PERTURBATION

(75) Inventors: Fred Andree, Brookline, MA (US); Thomas A. Schuneman, Medford, MA (US)

(73) Assignee: CSR Imaging US, LP, Burlington, MA (US)

( * ) Notice: Subject to any disclaimer, the term of this patent is extended or adjusted under 35 U.S.C. 154(b) by 188 days.

(21) Appl. No.: 13/163,282

(22) Filed: Jun. 17, 2011

Related U.S. Application Data

(60) Provisional application No. 61/356,147, filed on Jun. 18, 2010.

(51) Int. Cl.
*G06K 9/00* (2006.01)

(52) U.S. Cl.
USPC .......................................................... 382/162

(58) Field of Classification Search
USPC ................... 382/162, 167; 358/1.9, 2.1, 518; 345/600–604
See application file for complete search history.

(56) References Cited

U.S. PATENT DOCUMENTS

| | | | |
|---|---|---|---|
| 6,115,031 A | 9/2000 | Love et al. | |
| 6,421,140 B1 | 7/2002 | Hui | |
| 7,130,081 B2 | 10/2006 | Nose et al. | |
| 7,557,954 B2 | 7/2009 | Heydinger et al. | |
| 7,835,574 B2 * | 11/2010 | Ramanath | 382/167 |

FOREIGN PATENT DOCUMENTS

JP 2007288319 11/2007

OTHER PUBLICATIONS

Motorola; T. Schuneman et al., IP. com PriorArtDatabase, Technical Disclosure, "Fast color conversion algrithm allowing non-uniform table sampling," Dec. 17, 2003, ip.com, www.ip.com, 4 pages.
Dennis Bragg, Graphics Software, Inc., "A Simple Color Reduction Filter," Academic Press, Inc. 1992, pp. 20-22.

* cited by examiner

*Primary Examiner* — Jose Couso
(74) *Attorney, Agent, or Firm* — Fulbright & Jaworski LLP

(57) ABSTRACT

Systems and methods which provide color conversion using intelligent boundary point perturbation techniques are shown. Embodiments operate to initially select only boundary point indices for indexing data of an input color space to a color space transformation matrix representing the transformation between the input color space and an output color space. A boundary point perturbation process is applied to the initially selected boundary point indices to intelligently alter the boundary point index selections and thereby provide selection of boundary point indices having intelligent boundary point perturbation. Embodiments of the invention utilize an intelligent address generator to selectively apply constraints when indexing the input color space values to boundary points within a color look up table for transforming the input color space values to appropriate output color space values using the boundary point indices provided by the boundary point perturbation process.

39 Claims, 5 Drawing Sheets

SYSTEMS AND METHODS FOR COLOR CONVERSION USING INTELLIGENT BOUNDARY POINT PERTURBATION

RELATED APPLICATIONS

The present application claims benefit of priority to U.S. provisional patent application Ser. No. 61/356,147 entitled "Screened Statistical Color Conversion," filed Jun. 18, 2010, the disclosure of which is hereby incorporated herein by reference.

TECHNICAL FIELD

The invention relates generally to color conversion and, more particularly, to techniques for color conversion using intelligent color space boundary point perturbation.

BACKGROUND OF THE INVENTION

Color conversion processes convert color data captured, created, or otherwise used by one device to data that is appropriate for use by or with another device. For example, digital scanner systems often use an optical imaging system to create a digital color image in an additive color space, such as the red, blue, green (RGB) color space. However, digital printer systems often use a subtractive color mixing process, such as the cyan, magenta, yellow, and key (CMYK) color, for producing printed color images. Accordingly, a color conversion process may be utilized to convert color data provided by the foregoing digital scanner system in an additive color space to a subtractive color space appropriate to the aforementioned digital printer system.

The color conversion transformation is usually a highly non-linear vector function which is difficult to accurately represent as a set of polynomial equations. Accordingly, color conversion processes often employ a multi-dimensional color look up table (CLUT) to represent the transformation between color spaces. The input color space, however, is relatively sparsely sampled when generating such a CLUT because fully sampling the color space requires significant resources (e.g., memory, processor cycles, etc.) which may not be available or practical. Color conversion processes will thus perform interpolation to compute the entries that are not discretely represented in the CLUT. The model that underlies the multi-dimensional CLUT, however, is non-linear and thus the results of the linear interpolation that is generally utilized can include readily visible errors.

For example, color conversion processes converting from RGB color space to CMYK color space generally utilize interpolation within a three-dimensional (3D) RGB CLUT. The interpolation involves a series of calculations that are often time consuming and/or logic intensive and the results can also be poor. Using tetrahedral interpolation while trying to print a gray ramp, for example, hue changes in the gray ramp may be readily visible as the interpolation makes steps in C, M, Y, and K, but not at the same gray level. For instance, the color conversion process interpolation may make a step in the C axis without making a step in the M and Y axes, thus resulting in a gray pixel in from the RGB color space having a blue tinge to it in the CMYK color space. Even where the interpolation of the color conversion process selects colors for two adjacent pixels that would visually appear not to be different otherwise, the use of these colors in the context of a grayscale ramp may result in visible artifacts (e.g., Mach band wherein an artificially light or dark band is present at the boundary of the pixels).

Attempts have been made to provide color conversion without the use of typical interpolation techniques. For example, "Fast color conversion algorithm allowing non-uniform table sampling," Tom Schuneman et al. (Motorola, Inc. Dec. 17, 2003), the disclosure of which is hereby incorporated herein by reference, describes a method for performing fast conversion between color spaces that uses the CMYK values from one of the corners of the particular sub-cube containing the input RGB value in the 3D color table. Since one of the values from the table is always used, there is no interpolation. A drawback to this method is that it only uses a pseudo random number generator to pick which corner of the sub-cube in proportion to how close the input value was to that corner. Thus, a series of input values in the center of a 3D sub cube would result in an even distribution of all 8 corner values and RGB values nearer one corner in the 3D sub cube would get a higher proportion of the value from that corner. This results in undesired artifacts being present in the color converted image. For example, as a gray axis is traversed between gray nodes, gray levels halfway between nodes receive equal contributions from the other 6 corners of the sub-cube that are not gray nodes (i.e., these other 6 nodes are not gray and do not necessarily average to gray). Thus, the gray ramp provided by the method has a colored hue between gray nodes, rather than providing true grays in the color converted image. Moreover, the texture of a solid area of a single color in the results provided by the method depends on how close the input color was to a sub-cube corner. If the input color was very close to a corner, the texture was smooth with the dominant color and a sprinkling of other colors. However, if the input color was near the middle of a sub-cube, the texture of the results provided by the method had a mottled mixture of colors which appears as a texture difference (e.g., areas 401-404 of FIG. 4). Accordingly, artifacts associated with texture differences are present in the color converted image.

BRIEF SUMMARY OF THE INVENTION

The present invention is directed to systems and methods which provide color conversion using intelligent boundary point perturbation techniques. Embodiments of the present invention operate to initially select only boundary point indices, such as indices associated with sub-unit nodes (e.g., sub-cube corners in a 3D color space transformation matrix), for indexing data of an input color space to a color space transformation matrix representing the transformation between the input color space and an output color space. A boundary point perturbation process is applied to the initially selected boundary point indices to intelligently alter the boundary point index selections and thereby provide selection of boundary point indices having intelligent boundary point perturbation. Alteration of initially selected boundary point indices by a boundary point perturbation process of embodiments also only provides boundary point indices, albeit perturbed or different boundary point indices (e.g., an index associated with a different sub-unit node of the color space transformation matrix). The boundary point indices provided by the boundary point perturbation process may be used to index the input color space values to boundary points within a color look up table for transforming the input color space values to appropriate output color space values.

Boundary point perturbation processes as may be utilized according to embodiments of the invention employ a statistically derived noise matrix to alter initially selected boundary point indices and provide boundary point indices having intelligent boundary point perturbation. The noise matrix of embodiments is independent of the input color space values and thus provides alteration of initially selected boundary point indices based upon information in addition to or in the alternative to the color space value itself, neighboring color space values, etc. The noise matrix of embodiments may, for example, be pixel location based to facilitate intelligently derived boundary point perturbation which is adapted to mitigate various color transformation artifacts, such as Mach bands, differences in texture, image graininess, etc.

A noise matrix utilized according to embodiments of the invention may comprise a matrix of perturbation threshold values indexed by physical location of pixels in an image. A perturbation threshold value for a particular pixel location from the noise matrix may be compared to one or more value derived from the input color space value for determining if the initially selected boundary point index for that input color space value is to be altered by the perturbation process.

As can be appreciated from the foregoing, boundary point perturbation processes in accordance with the concepts of the present invention operate to control the distribution of boundary point choices with a stochastic technique. The stochastic technique implemented through the noise matrix of embodiments has minimal low frequency components, wherein low frequency repetitions are visible in a color transformed image as mottling or texture differences, and thus produces superior smoothness throughout the color ramp. For example, a pixel location based noise matrix of embodiments facilitates decorrelation of the transformed color values while avoiding low frequency repetition of boundary point index selection to mitigate image graininess associated with randomly decorrelated color values (e.g., stochastically moving conversion errors, such as to smooth out the image and/or compensate for other issues).

Embodiments of the invention utilize an intelligent address generator to index the input color space values to boundary points within a color look up table for transforming the input color space values to appropriate output color space values using the boundary point indices provided by the boundary point perturbation process. For example, CLUT address generation from the boundary point indices provided by the boundary point perturbation process may comprise one or more constraint according to embodiments of the invention, such as to facilitate desired results, to accommodate particular data sets, etc. For example, where an input color space value represents a gray value (e.g., in the 3D RGB color space R=G=B), embodiments of the present invention may operate to constrain the generated CLUT address to a subset of boundary points representing gray (e.g., select one of two gray sub-cube corners in the 3D RGB color space). Where the boundary point indices selected by the boundary point perturbation process do not map to a boundary point meeting the constraints, an intelligent address generator of embodiments herein may apply intelligence to alter one or more of the selected indices so that a boundary point meeting the constraints is selected. Such embodiments both avoid hue shifts in a gray color ramp and texture differences depending on color.

From the foregoing, it can be seen that color conversion using intelligent boundary point perturbation in accordance with the concepts herein produces higher quality output and can be used more broadly than prior art color conversion techniques. Moreover, color conversion processes in accordance with the concepts herein offer advantages of increased speed, reduced computation, and lower memory bandwidth. Thus, such color conversion processes provide higher quality color conversion at higher speeds and lower memory bandwidth. Accordingly, color conversion techniques of embodiments of the present invention may be utilized with respect to a number of devices, particularly devices having limited resources (e.g., memory limitations, processor speed or power limitations, communication speed or bandwidth limitations, etc.), such as general purpose computers, printers, mobile telephones, personal digital assistants, tablet devices, display devices, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

In order to aid in understanding the concepts of the present invention, embodiments will be described with reference to the use of 3D color space transformation matrices, the RGB color space, and/or the CMYK color space in order to provide readily understandable examples. It should be appreciated that the concepts herein are not limited to applicability to these examples and thus may be applied to color space transformation matrices having a number of dimensions other than three and/or color spaces other than RGB and CMYK.

Figure 1:
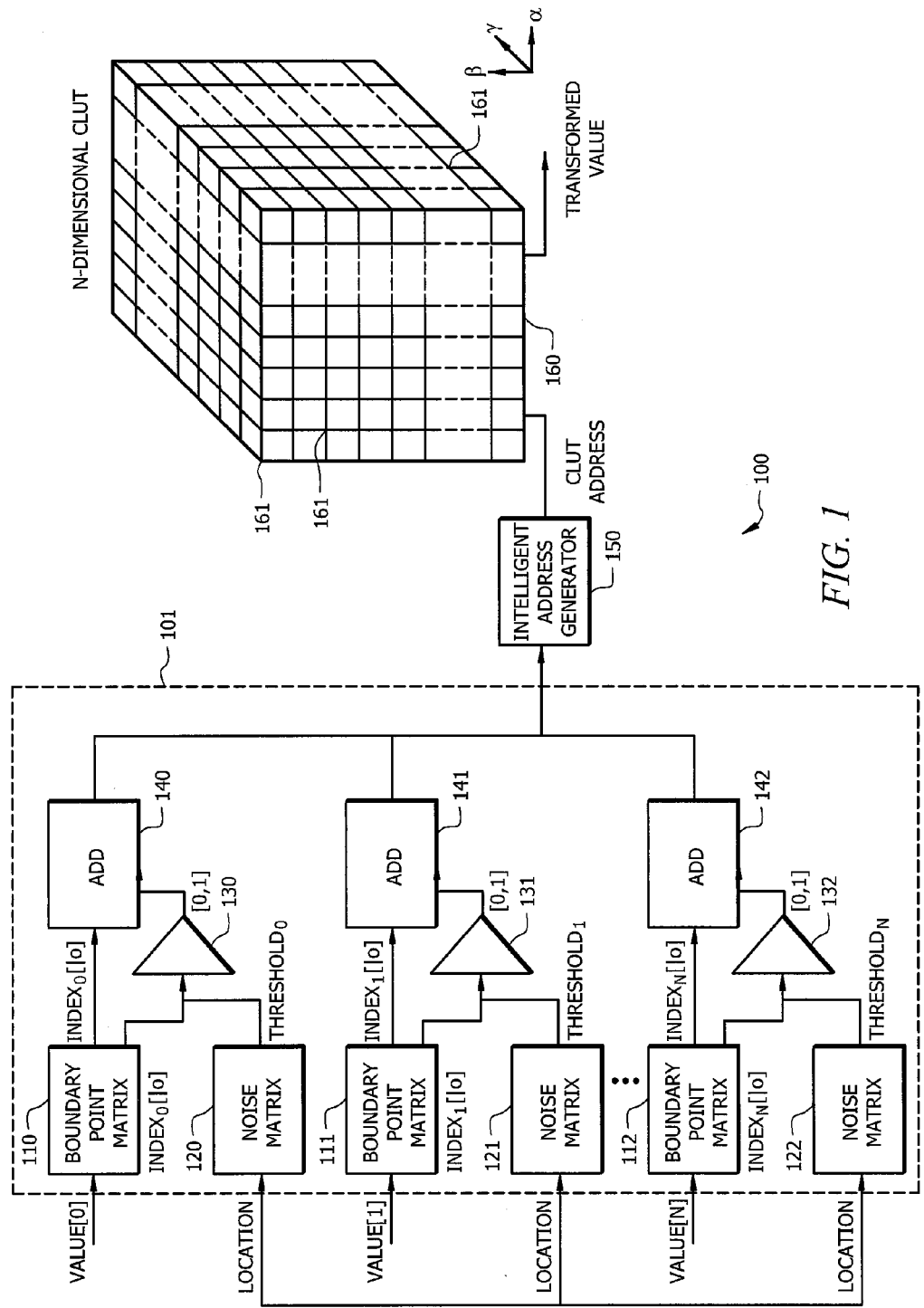
FIG. 1 shows a functional block diagram of a color conversion system adapted to use intelligent boundary point perturbation according to embodiments of the present invention.

FIG. 1 shows a functional block diagram of a color conversion system adapted to use intelligent boundary point perturbation according to embodiments of the invention. It should be appreciated that intelligent boundary point perturbation provided in accordance with embodiments of the invention may implement various information based techniques, such as using statistically derived decision metrics, in realizing advantages of the concepts. In particular, intelligent boundary point perturbation according to embodiments provides non-random and non-pseudorandom color value decorrelation for suppressing undesired low frequency color repetitions.

Color conversion system 100 of the illustrated embodiment receives N-dimensional input color space information for transformation into P-dimensional output color space information through the use of N-dimensional CLUT 160, wherein N and P may be the same or different. N-dimensional CLUT 160 may comprise a relatively sparsely sampled multi-dimensional color look up table representing the transformation between the input color space and the output color space. It should be appreciated that, although sub-unit nodes 161 are visible in FIG. 1 only on the exterior of N-dimensional CLUT 160, sub-unit nodes 161 are present at all sub-unit division line intersections, including those interior to N-dimensional CLUT 160.

Boundary point matrices 110-112 of the illustrated embodiment of color conversion system 100 provide a boundary point mapper operable to initially select boundary points within N-dimensional CLUT 160 for the input color space dimension values. Embodiments of the present invention operate to initially select only boundary point indices, such as indices associated with sub-unit nodes (e.g., sub-cube corners in a 3D color space transformation matrix), for indexing data of an input color space to a color space transformation matrix representing the transformation between the input color space and an output color space. Noise matrices 120-122, comparators 130-132, and adders 140-142 of the illustrated embodiment of color conversion system 100 provide a boundary point perturbation system (intelligent boundary point perturbation system 101) operable to perturb the initially selected boundary point indices according to a boundary point perturbation process. For example, a boundary point perturbation process is applied to the initially selected boundary point indices to intelligently alter the boundary point index selections and thereby provide selection of boundary point indices having intelligent boundary point perturbation. Intelligent address generator 150 of embodiments of color conversion system 100 to map the boundary point indices provided by the boundary point mapper, as may be altered by the boundary point perturbation system, to appropriate CLUT addresses of N-dimensional CLUT 160. Accordingly, boundary point matrices 110-112, noise matrices 120-122, comparators 130-132, adders 140-142, and intelligent address generator 150 of color conversion system 100 cooperate to map input color space values to boundary points (e.g., one of sub-unit nodes 161) within N-dimensional CLUT 160, while providing intelligent boundary point perturbation, for transforming the input color space values to appropriate output color space values. Additionally, intelligent address generator 150 may impose one or more constraint according to embodiments of the invention, such as to facilitate desired results, to accommodate particular data sets, etc., and thus operate to alter one or more of the indices selected by the boundary point perturbation process so that a boundary point meeting the constraints is selected within N-dimensional CLUT 160.

It should be appreciated that the illustrated embodiment of color conversion system 100 provides boundary point indexing individually for each dimension of the input color space. Such a configuration facilitates the use of non-uniformly sampled CLUT color transformation data. Accordingly, color transformation data may be intelligently sampled, such as using information about the underlying model and/or where points of inflection will be located, to provide a CLUT configuration which minimizes color conversion error.

In operation according to embodiments of the present invention, color conversion system 100 may implement an intelligent boundary point perturbation color conversion technique by dividing the input color coordinates to the color transform into two parts (e.g., a most significant part and a least significant part) for each input color. The most significant parts may be used to select a specific sub-unit node in N-dimensional CLUT 160. The least significant parts may be used in a boundary point perturbation process to determine if the sub-unit node selection should be perturbed (e.g., choose between the high or low part of the sub-unit along a given color axis). By applying this algorithm to all 3 axes, a single sub-unit node within N-dimensional CLUT 160 is selected. The output color space values associated with the selected sub-unit node are output as the transformed color values.

Figure 2:
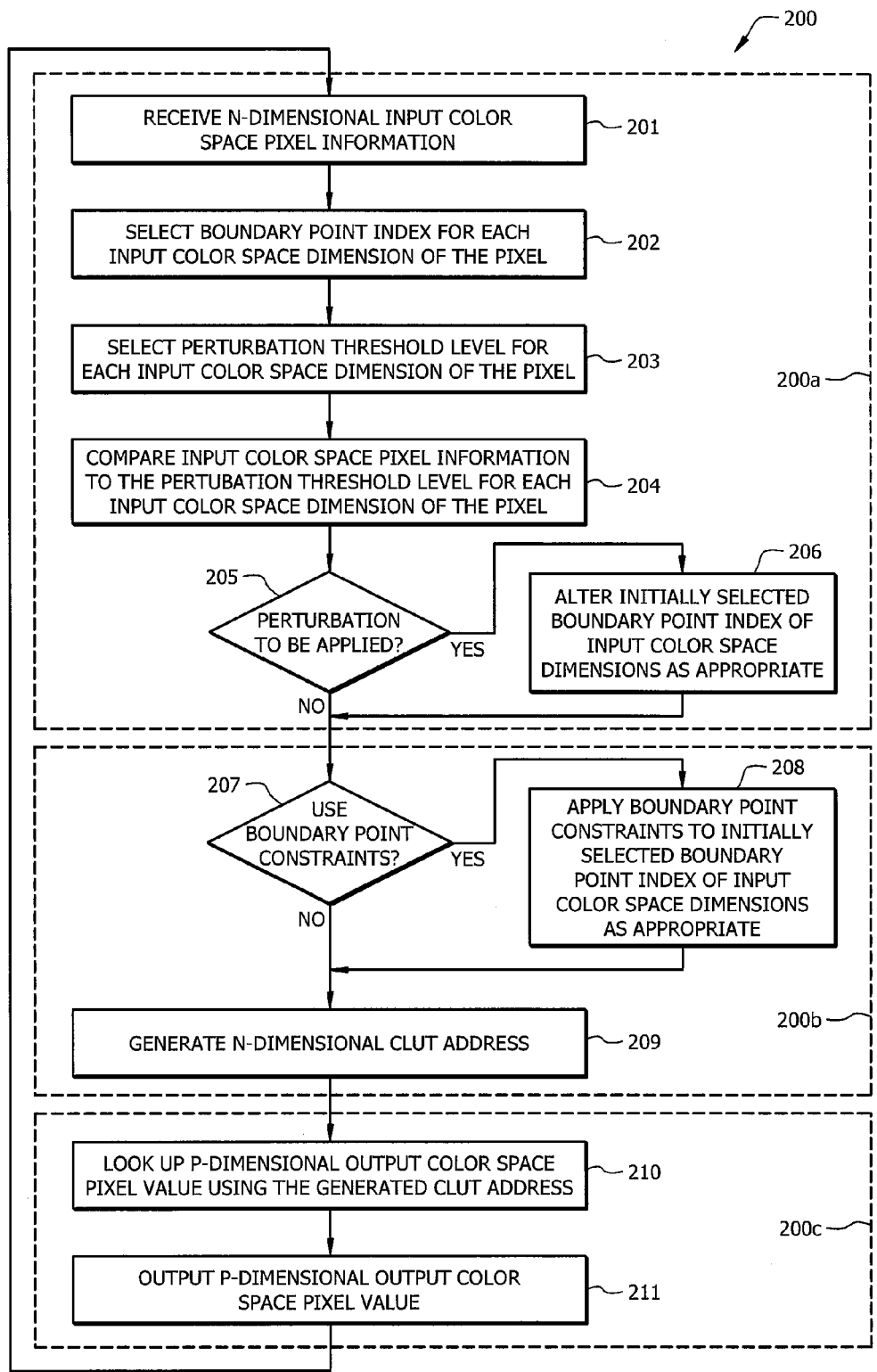
FIG. 2 shows a flow diagram providing details of operation of the color conversion system of FIG. 1 to provide transformation of input color space information to output color space information according to embodiments of the present invention

FIG. 2 shows a flow diagram providing details of the foregoing operation of color conversion system 100 to provide transformation of input color space information to output color space information according to embodiments. Specifically, portion 200a of process 200 (blocks 201-206) provides intelligent boundary point perturbation operation (e.g., operation of intelligent boundary point perturbation system 101) for color conversion while portion 200b of process 200 (blocks 207-209) provides intelligent address generation for color conversion (e.g., operation of intelligent address generator 150) according to embodiments of the invention. Portion 200c of process 200 (blocks 210-211) provides conversion of the boundary point addresses provided by intelligent boundary point perturbation of portion 200a and intelligent address generation of portion 200b to output color space pixel values using N-dimensional CLUT 160.

It should be appreciated that process 200 of the illustrated embodiment provides transformation of N-dimensional input color space pixel values to P-dimensional output color space pixel values, wherein N and P may be the same or different. For example, the N-dimensional input color space pixel information of process 200 may comprise 3D RGB pixel values and image location information while the output color space pixel values of process 200 may comprise 4D CMYK pixel values and image location information.

At block 201 of the illustrated embodiment, process 200 receives N-dimensional input color space pixel information for providing color conversion. For example, the N-dimensional input color space pixel information may comprise 3D RGB pixel values (e.g., pixel R value, pixel G value, and pixel B value) and image location information (e.g., pixel raster x, y location).

At block 202 of process 200, boundary point indices are selected for each dimension of the input color space pixel. For example, boundary point matrices 110-112 may provide indices (Index[hi]) to sub-unit divisions of corresponding axes of N-dimensional CLUT 160. In accordance with embodiments herein, boundary point matrix 110 may provide an index to sub-unit divisions of the α axis of N-dimensional CLUT 160, boundary point matrix 111 may provide an index to sub-unit divisions of the β axis of N-dimensional CLUT 160, and boundary point matrix 112 may provide an index to sub-unit divisions of the γ axis of N-dimensional CLUT 160. Boundary point matrices 110-112 may, for example, comprise a one-dimensional look up table (LUT) mapping an associated input color space dimension value to one or more indices (e.g., Index[hi] and Index[lo]) used in accordance with the concepts herein to select an appropriate boundary point and to implement intelligent boundary point perturbation. Additionally or alternatively, boundary point matrices 110-112 may perform calculations with respect to an associated input color space dimension value for determining one or more indices.

In the illustrated embodiment, the input color space pixel value for each dimension (e.g., Value[0] representing R, Value[1] representing G, and Value[N] representing B in the foregoing 3D RGB color space example) is used with a corresponding boundary point matrix (e.g., boundary point matrices 110-112) to select a boundary point index for each dimension of the input color space pixel (e.g., $Index_0[hi]$, $Index_1[hi]$, and $index_N[hi]$). In operation according to an embodiment of the invention, a lower boundary point index is selected for any input color space pixel dimension where the input color space pixel value for that dimension falls between two boundary point indices. For example, where there are 16 sub-unit divisions along an axis of N-dimensional CLUT 160 and the input color space pixel value for the dimension of that axis is not an integer product of 16 (e.g., Value[X]/16 is not an integer), and thus falls between indices of two sub-unit divisions, the lower boundary point index is selected to facilitate additive boundary point index perturbation as described below. Selection of the higher boundary point index may be utilized according to alternative embodiments, such as where subtractive boundary point index perturbation is to be used.

It should be appreciated that the illustrated embodiment of boundary point matrices 110-112 provide a plurality of indices (e.g., Index[hi] and Index[lo]) for each input color space dimension value. One such index (boundary point index, Index[hi]) for each input color space dimension value provides an initial selection of boundary point with respect to that input color space dimension value, as discussed above. Another such index (boundary point perturbation index, Index[lo]) for each input color space dimension value provides a boundary point perturbation index utilized in the boundary point perturbation process of embodiments, as described in detail below. Boundary point perturbation indices (Index[lo]) as may be utilized according to embodiments of the invention may provide information regarding the distance or offset of the corresponding input color space dimension value (Value) from the selected boundary point index (Index[hi]). Accordingly, boundary point matrices 110-112 may essentially divide the input color space dimension values into two parts, a most significant part (boundary point index, Index[hi]) and a least significant part (boundary point perturbation index, Index[lo]).

At block 203 of the illustrated embodiment, perturbation threshold values are selected for each dimension of the input color space pixel. For example, noise matrices 120-122 may provide threshold values (Threshold) for each input color space dimension value to be utilized in the boundary point perturbation process of embodiments.

In accordance with embodiments herein, noise matrices 120-122 comprise statistically derived noise matrices (e.g., techniques such as those of Blue Noise Mask technology or void and cluster methods may be used in statistically deriving noise matrices) providing threshold values (e.g., $Threshold_0$, $Threshold_1$, and $Threshold_N$) for each input color space dimension value for use by a boundary point perturbation process to alter initially selected boundary point indices and thereby provide boundary point indices having intelligent boundary point perturbation. For example, noise matrices 120-122 may be calculated so that statistically the mean is a middle value but spatially it produces relatively uniform shapes of selection of lower versus upper values of boundary point indices, and thus does not distribute them randomly. It should be appreciated that noise matrices 120-122 may be the same or different as to one another. For example, each of noise matrices 120-122 may be specifically adapted for a particular input color space dimension associated therewith.

The noise matrices of embodiments is independent of the input color space values and thus provides alteration of initially selected boundary point indices based upon information in addition to or in the alternative to the color space value itself, neighboring color space values, etc. Noise matrices 120-122 of the illustrated embodiment, for example, are pixel location based. Noise matrices 120-122 may thus comprise a multi-dimensional (e.g., two-dimensional for a two-dimensional image or three-dimensional for a three-dimensional image) LUT mapping an associated input color space pixel location (e.g., pixel raster x, y location) to one or more threshold values (e.g., Threshold) used in accordance with the concepts herein to provide boundary point perturbation. Additionally or alternatively, noise matrices 120-122 may perform calculations with respect to an associated input color space pixel location for determining one or more threshold values.

Blocks 204-206 of process 200 implement a boundary point perturbation process in accordance with concepts of the present invention. In operation according to embodiments, a perturbation threshold value for a particular pixel location from the noise matrix may be compared to one or more value derived from the input color space dimension value for determining if the initially selected boundary point index for that input color space dimension value is to be altered by the perturbation process. Accordingly, at block 204 of the illustrated embodiment, input color space pixel information is compared to appropriate perturbation threshold values. For example, comparators 130-133 may compare the bounding point perturbation indices, $Index_0[lo]$, $Index_1[lo]$, and $Index_N[lo]$, derived from each input color space dimension value by bounding point matrices 110-112 to a corresponding one of the threshold values, $Threshold_0$, $Threshold_1$, and $Threshold_N$, provided by nose matrices 120-122.

In operation of comparators 130-133 of embodiments, if the boundary point perturbation index value is less than the corresponding perturbation threshold value then a respective one of comparators 130-131 signals (e.g., outputs a 0 perturbation value) that no perturbation of the corresponding initially selected boundary point index is to be performed. However, if the boundary point perturbation index value is greater than or equal to the corresponding perturbation threshold value then a respective one of comparators 130-131 signals (e.g., outputs a 1 perturbation value) that perturbation of the corresponding initially selected boundary point is to be performed.

At block 205 of the illustrated embodiment, a determination is made as to whether perturbation is to be applied with respect to any of the initially selected boundary point indices, $Index_0[hi]$, $Index_1[hi]$, and $index_N[hi]$. If it is determined that perturbation is not to be applied to an initially selected boundary point index, processing according to the illustrated embodiment for that input color space dimension proceeds to block 207. However, if it is determined that perturbation is to be applied to an initially selected boundary point index, processing according to the illustrated embodiment for that input color space dimension proceeds to block 206 wherein appropriate boundary point index perturbation is applied.

At block 206 of process 200, appropriate ones of the boundary point indices, $Index_0[hi]$, $Index_1[hi]$, and $index_N[hi]$, are altered in accordance with a boundary point perturbation process herein. For example, adders 140-142 may be utilized to add a value to an initially selected boundary point index for which it has been determined that perturbation is to apply. In operation according to embodiments of the invention, adders 140-142 operate to add the perturbation values output by a respective one of comparators 130-132 to the boundary point index output by a respective one of boundary point matrices 110-112. Accordingly, the outputs of adders 140-142 of the illustrated embodiment provide boundary point indices having intelligent boundary point perturbation, as applied in accordance with noise matrices 120-122.

The boundary point indices provided by adders 140-142 are used to index the input color space values to boundary points within N-dimensional CLUT 160 for transforming the input color space values to appropriate output color space values. Accordingly, the boundary point indices output by adders 140-142 are provided to intelligent address generator 150 to generate a CLUT address for use with respect to N-dimensional CLUT 160 in determining the appropriate P-dimensional output color space pixel value.

Embodiments utilize intelligence in generating a CLUT address to index the input color space values to boundary points within N-dimensional CLUT 160 for transforming the input color space values to appropriate output color space values. CLUT address generation from the boundary point indices provided by may comprise one or more constraint according to embodiments of the invention, such as to facilitate desired results, to accommodate particular data sets, etc. For example, where an input color space value represents a neutral value (e.g., gray in the 3D RGB color space, where R=G=B), embodiments of the present invention may operate to constrain the generated CLUT address to a subset of boundary points along the neutral axis (e.g., select one of two gray sub-cube corners in the 3D RGB color space). Where the selected boundary point indices do not map to a boundary point meeting the constraints, intelligent address generator 150 of embodiments applies intelligence to alter one or more of the selected indices so that a boundary point meeting the constraints is selected.

At block 207 of the illustrated embodiment, a determination is made by intelligent address generator 150 as to whether boundary point constraints are to be used with respect to the present pixel. For example, the input color space values may be analyzed by intelligent address generator 150 to determine that the pixel represents a special case, such as a neutral value pixel (e.g., gray pixel, where R=G=B), and thus boundary point constraints are to be applied. If it is determined that boundary point constraints are to be used, processing according to the illustrated embodiment proceeds to block 208 for implementation of the appropriate boundary point constraints. However, if it is determined that boundary point constraints are not to be used, processing according to the illustrated embodiment proceeds to block 209 for generating a N-dimensional CLUT address using the boundary point indices.

At block 208 of process 200, boundary point constraints are applied to the selected boundary point indices as appropriate. Such boundary point constraints may reduce the boundary point indices available for use for the pixel to some subset of boundary point indices otherwise available in order to facilitate particular desired results, to accommodate particular data sets, etc. For example, in the foregoing example wherein the input color space values are analyzed and it is determined that the special case of a neutral value pixel is represented, only the boundary points along the neutral axis may be made available for selection for that pixel. Thus, intelligent address generator 150 may generate the CLUT address for one such neutral value boundary point for a sub-cube to which the selected boundary point indices would otherwise map. For example, where analysis of the input color space values indicates a particular primary color in the input (e.g., yellow, where R=G and B=0), operation of intelligent address generator 150 may operate to apply the same perturbation to the input color space values being perturbed (e.g., applying the same perturbation to R and G), to thereby generate the CLUT address for a neutral value boundary point.

At block 209 of the illustrated embodiment, intelligent address generator 150 utilizes the selected boundary point indices to generate a N-dimensional CLUT address to index the input color space values to a boundary point within N-dimensional CLUT 160. For example, the boundary point indices selected for each of input color space values Value[0], Value[1], and Value[N] are combined to generate an N-dimensional address corresponding to a particular one of sub-unit nodes 161 in N-dimensional CLUT 160.

At block 210 of process 200, the generated N-dimensional CLUT address is used to access N-dimensional CLUT 160 and obtain the output color space values corresponding to the input color space values, thereby transforming the input color space values to appropriate output color space values. It should be appreciated that the output color space values provided by N-dimensional CLUT 160 may have fewer, the same, or more dimensions (P-dimensions) than the dimensions present in the input color space values (N-dimensions).

At block 211 of the illustrated embodiment, the P-dimensional output color space values indicated in N-dimensional CLUT 160 by the CLUT address provided by intelligent address generator 150 are output. Thus, the input color space values have been transformed into output color space values as may be used by various systems and processes, such as printing, image rendering, data transmission, data storage, etc.

Having described process 200 of FIG. 2 providing color conversion using intelligent boundary point perturbation techniques according to embodiments of the invention, a more specific example of an algorithm for providing such color conversion in a RGB to CMYK color transformation with a 17 cubed 3D color table with 8 bit RGB input. The inputs to the process of an embodiment are (wherein the variables "x" may be thought of as representing the particular pixel and "y" may be thought of as representing the particular line according to embodiments):

RGBtoCMYKtable[red index][green index][blue index]
The inputs are three 4 bit indices. The outputs are four 8 bit CMYK values.
RGB_input_image[y][x]
This is the two dimensional input image in 8 bit RGB.
RGB_perturbation_matrix[y][x]
This is the two dimensional perturbation_matrix in 4 bit RGB.

The algorithm of an embodiment would work as set forth below with respect to one pixel:
//get red, green and blue input values
Rin, Gin, Bin=RGB_input_image[y][x]
// get RGB most significant bits as indices for proper sub-cube
Rindex=Rin/16
Gindex=Gin/16
Bindex=Bin/16
// get RGB least significant bits (lsb) for corner selection
Rlsb=Rin & 15
Glsb=Gin & 15
Blsb=Bin & 15
// get 4 bit RGB perturbation matrix values Rperturbation_matrix, Gperturbation_matrix, Bperturbation_matrix=RGB_perturbationmatrix[y][x]
// combine RGB perturbation matrix and RGBlsb to adjust RGBindex
If(Rlsb+Rperturbation_matrix >=16)
++Rindex
If(Glsb+Gperturbation_matrix >=16)
++Gindex
If(Blsb+Bperturbation_matrix >=16)
++Bindex
//get CMYK output value
CMYK_output[y][x]=RGBtoCMYKtable[Rindex][Gindex][Bindex]

It should be appreciated that, when implemented in software, elements of the present invention are essentially the code segments to perform tasks described herein. The program or code segments can be stored in a processor-based system (computer) readable medium or transmitted by a computer data signal embodied in a carrier wave over a transmission medium. The computer readable medium may include any medium that can store the code segments. Examples of a computer readable medium include an electronic circuit, a semiconductor memory device, a random access memory (RAM), a read only memory (ROM), a flash memory, an erasable ROM (EROM), a magnetic disk, a compact disk CD-ROM, an optical disk, etc. The computer data signal may include any signal that can propagate over a transmission medium such as electronic network channels, optical fibers, air, electromagnetic, RF links, etc. The code segments may comprise various forms of applications or applets, such as computer software, smart phone apps, browser based applets, etc., as may be downloaded via computer networks such as the Internet, an intranet, a local area network (LAN), a wide area network (WAN), etc. Moreover, the code segments may be provided in cloud based computing configurations and/or hosted computing configurations.

Figure 3:
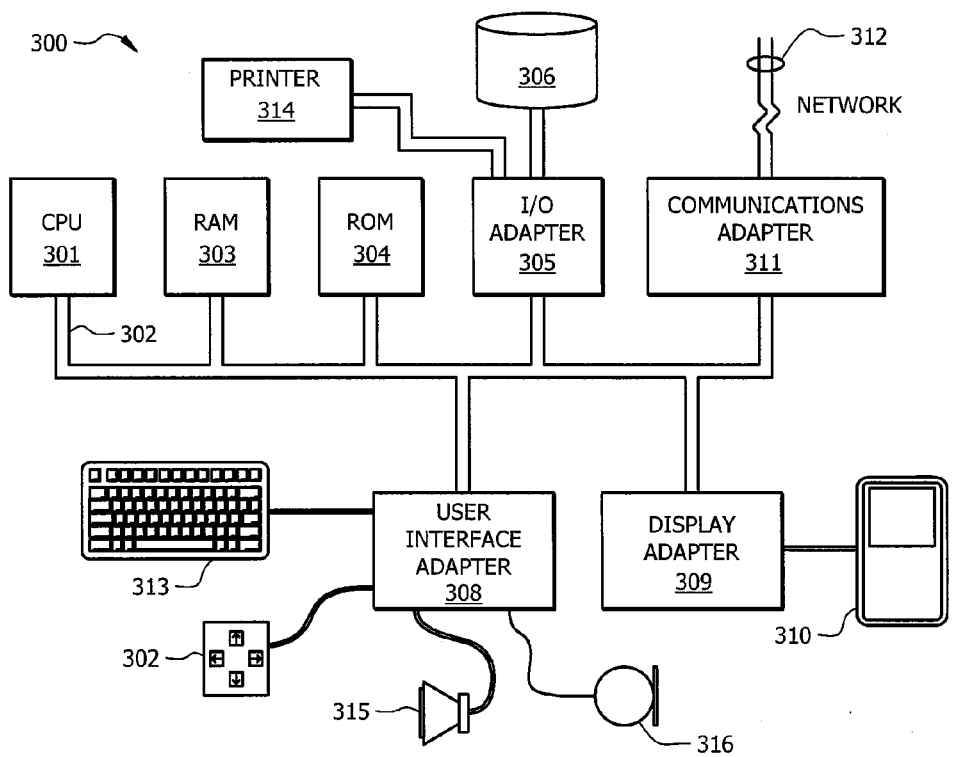
FIG. 3 shows a processor-based system adapted for use in providing embodiments of the present invention.

FIG. 3 illustrates processor-based system 300 adapted for use in providing embodiments of the present invention. Processor-based system may comprise various processor-based platforms that may implement the color conversion techniques herein, such as general purpose computers (e.g., laptop computers, desk top computers, notebook computers, etc.), printers (e.g., laser printers, ink jet printers, dot matrix printers, etc.), mobile telephones (e.g., smart phones, personal communication system (PCS) phones, etc.), personal digital assistants (e.g., electronic planners, electronic messaging systems, etc.), tablet devices (e.g., electronic readers, tablet based personal digital assistants, mobile digital devices, tablet computers, etc.), display devices (e.g., computer monitors, televisions, image projectors, digital photo frames, etc.), and/or the like.

Central processing unit (CPU) 301 of processor-based system 300 of the illustrated embodiment is coupled to system bus 302. CPU 301 may be any general purpose CPU, such as a PENTIUM or CORE processor available from Intel Corporation. However, the present invention is not restricted by the architecture of CPU 301 as long as CPU 301 supports the inventive operations as described herein. Bus 302 is coupled to RAM 303, which may comprise various forms of random access memory known in the art. ROM 304, as may comprise various forms of read only memory known in the art, is also coupled to bus 302. RAM 303 and/or ROM 304 hold user and system data and programs (e.g., program or code segments) for providing operation as described herein.

Bus 302 is also coupled to input/output (I/O) controller 305, communications adapter 311, user interface adapter 308, and display adapter 309. I/O adapter 305 connects to storage devices 306, such as one or more of a hard drive, a CD drive, solid state drive, etc., to the processor-based system. I/O adapter 305 is also connected to printer 314, which allows the system to output copies of information such as documents, reports, etc. Communications adapter 311 is adapted to couple processor-based system 300 to network 312, which may comprise one or more of a telephone network, a LAN, a WAN, the Internet, etc. User interface adapter 308 couples user input devices, such as keyboard 313, pointing device 307 (e.g., mouse, trackball, touch screen, digitizing tablet, etc.), and microphone 316, to the processor-based system 300. User interface adapter 308 also provides sound output to a user via speaker(s) 315. Display adapter 309 is driven by CPU 301 to control the display on display device 310.

Figure 4:
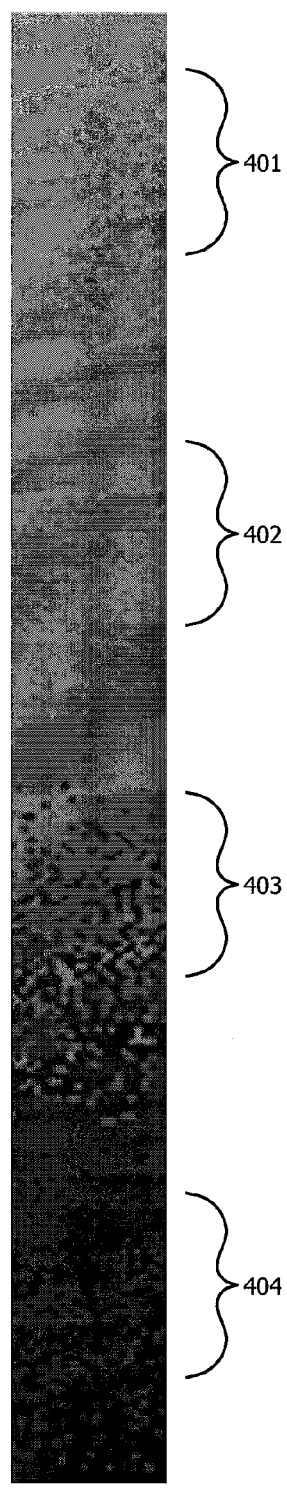
FIG. 4 shows a representation of a portion of an image converted between color spaces using sub-cube corner values, wherein a pseudo random number generator is used to select the particular corner of the sub-cube.
Figure 5:
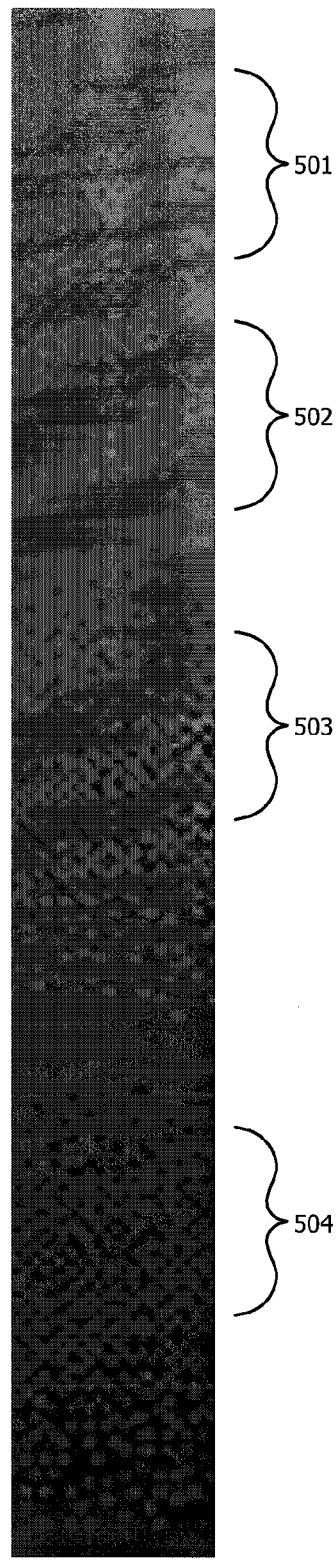
FIG. 5 shows a representation of a portion of an image converted between color spaces using intelligent boundary point perturbation according to embodiments of the invention.

From the foregoing it can be appreciated that color conversion using intelligent boundary point perturbation according to embodiments herein addresses several problems commonly experienced by prior color conversion techniques. For example, texture mottling resulting when an input color is relatively far from any sub-unit node of a multi-dimensional CLUT is mitigated by embodiments herein (e.g., compare areas 501-504 of FIG. 5 with areas 401-404 of FIG. 4). Similarly, texture transitions associated with movement of an input color from near a CLUT sub-unit node to an input color relatively far from a CLUT sub-unit node are avoided according to embodiments herein. The intelligently applied boundary point perturbation techniques of embodiments herein solve the foregoing problems by replacing the pseudorandom number generator that controls the distribution of corner choices with a stochastic noise matrix. The stochastic noise matrices of embodiments have minimal low frequency components and produce superior smoothness throughout the color ramp.

Moreover, colored hues along a gray ramp are avoided by embodiments herein. The application of boundary point constraints to allow the use of a subset of the possible sub-unit nodes (e.g., only sub-unit nodes on the gray axis where a gray pixel is being transformed) provide color conversion without introducing undesired hue shifts, etc. Such techniques may, for example, be performed along the entire gray axis or may be restricted to certain situations, such as being restricted to application to the darker side of a certain gray level cutoff (e.g., for the lightest shades the constraints may not be applied in order to use all 8 corners of the sub-cube).

Color conversion processes in accordance with the concepts herein offer advantages of increased speed, reduced computation, and lower memory bandwidth. Thus, such color conversion processes provide higher quality color conversion at higher speeds and lower memory bandwidth. Accordingly, color conversion techniques of embodiments of the present invention are particularly well suited for use with respect to devices having limited resources, such as memory limitations, processor speed limitations, processor power limitations, communication speed limitations, communication bandwidth limitations, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, at one or more processors, N-dimensional input color space pixel information;
   selecting, at one of said one or more processors, a boundary point index individually for each input color space dimension of the N-dimensional input color space pixel information;
   determining, at one of said one or more processors, using information based decision metrics, if one or more of the selected boundary point indices is to be adjusted; and
   adjusting, at one of said one or more processors, the one or more of the selected boundary point indices according to the information based decision metrics to thereby implement an intelligent boundary point perturbation process.

2. The method of claim 1, wherein the boundary point indices correspond to sub-unit nodes of a color look up table used in transforming the input color space pixel information into output color space pixel information.

3. The method of claim 2, wherein the selecting the boundary point index individually for each input color space dimension comprises:
   selecting the boundary point index for each input color space dimension without interpolation.

4. The method of claim 2, wherein the selecting the boundary point index individually for each input color space dimension comprises:
   using a one-dimensional look up table to map an input color space dimension value of the N-dimensional input color space pixel information to a respective boundary point index.

5. The method of claim 2, wherein the selecting the boundary point index individually for each input color space dimension comprises:
   selecting a lower boundary point index for any input color space pixel dimension value that falls between two boundary point indices.

6. The method of claim 1, wherein the determining if one or more of the selected boundary point indices is to be adjusted comprises:
   determining a perturbation threshold value for each input color space dimension independent of an input color space dimension value; and
   using the perturbation threshold value in association with a boundary point perturbation index to determine if boundary point perturbation is to be applied.

7. The method of claim 6, wherein the determining a perturbation threshold value for each input color space dimension independent of an input color space dimension value comprises:
   using a pixel location of the N-dimensional input color space pixel information to determine the perturbation threshold value.

8. The method of claim 6, wherein the using the perturbation threshold value in association with a boundary pint perturbation index comprises:
   comparing the perturbation threshold value for an input color space dimension to boundary point offset information provided by the boundary point perturbation index.

9. The method of claim 1, wherein information based decision metrics comprise a statistically derived noise matrix to control the boundary point index perturbation adjustment determination.

10. The method of claim 9, wherein the noise matrix comprises a multi-dimensional matrix mapping pixel locations to information for control the boundary point index perturbation alteration determination.

11. The method of claim 1, further comprising:
    generating a color look up table address from the boundary point indices provided by the intelligent boundary point perturbation process, wherein the generated color look up table address maps to a particular boundary point in the color look up table providing output color space pixel information corresponding to the input color space pixel information.

12. The method of claim 11, wherein the generating a color look up table address comprises:
    determining if a boundary point constraint is to be implemented with respect to the boundary point indices; and
    limiting the particular boundary points in the color look up table for which the color look up table address may be generated.

13. A system comprising:
    one or more computers comprising:
      a boundary point mapper operable to individually index each input color space dimension value of a pixel of an input color space to a corresponding boundary point index, wherein the boundary point indices are associated with sub-unit nodes of a color space transformation matrix representing transformation between the input color space and an output color space; and
      a boundary point perturbation system operable to determine, using information based decision metrics, if one or more boundary point indices, provided by the boundary point mapper, is to be altered and to alter the one or more boundary point indices according to the determinations.

14. The system of claim 13, wherein the boundary point mapper comprises an index mapper for each dimension of the input color space.

15. The system of claim 14, wherein the index mapper for each dimension of the input color space comprises a one-dimensional look up table mapping an associated input color space dimension value to at least one index, wherein the at least one index comprises a corresponding one of the boundary point indices.

16. The system of claim 15, wherein the at least one index further comprises a boundary point perturbation index for use by the boundary point perturbation system in determining if the corresponding boundary point index is to be altered.

17. The system of claim 16, wherein the boundary point perturbation index comprises a value derived from a distance the boundary point index is from the input color space dimension value.

18. The system of claim 13, wherein the boundary point perturbation system comprises an additive boundary point index perturbation system.

19. The system of claim 18, wherein the boundary point index for each input color space dimension comprises a lower boundary point index where any input color space pixel dimension value that falls between two boundary point indices.

20. The system of claim 13, wherein the information based decision metrics comprise:

a statistically derived noise matrix for each dimension of the input color space.

21. The system of claim 20, wherein the noise matrix for each dimension of the input color space provides a threshold value for an associated input color space dimension value for use in determining when to alter initially selected boundary point indices.

22. The system of claim 20, wherein the boundary point perturbation system further comprises:
a comparator for each dimension of the input color space.

23. The system of claim 22, wherein the comparator for each dimension of the input color space provides a comparison of a boundary point perturbation index provided by the boundary point mapper and a threshold provided by a corresponding one of the statistically derived noise matrices for determining when to alter initially selected boundary pint indices.

24. The system of claim 22, wherein the boundary point perturbation system further comprises:
an adder for each dimension of the input color space.

25. The system of claim 24, wherein the adder for each dimension of the input color space provides a sum of a boundary point index provided by the boundary point mapper and an output of an associated one of the comparators.

26. The system of claim 13, further comprising:
an intelligent address generator operable to map boundary point indices provided by the boundary point mapper, as altered by the boundary point perturbation system, to appropriate addresses of the color space transformation matrix representing transformation between the input color space and the output color space.

27. The system of claim 26, wherein the intelligent address generator is operable to apply boundary point mapping constraints with respect to particular input color space input values.

28. The system of claim 26, wherein the color space transformation matrix comprises N-dimensional color look up table, wherein N is equal to the dimensions of the input color space.

29. A computer program product for wireless communications in a wireless network, comprising:
a non-transitory computer-readable medium having program code recorded thereon, said program code comprising:
program code to select a boundary point index individually for each input color space dimension of N-dimensional input color space pixel information;
program code to determine, using information based decision metrics, if one or more of the selected boundary point indices are to be adjusted; and
program code to adjust the one or more of the selected boundary point indices according to the determination to thereby provide an intelligent boundary point perturbation process.

30. The computer program product of claim 29, wherein the boundary point indices correspond to sub-unit nodes of a color look up table used in transforming the input color space pixel information into output color space pixel information.

31. The computer program product of claim 30, wherein the program code to select the boundary point index for each input color space dimension uses a one-dimensional look up table to map an input color space dimension value of the N-dimensional input color space pixel information to a respective boundary point index.

32. The computer program product of claim 30, wherein the program code to select the boundary point index for each input color space dimension comprises:
program code to select a lower boundary point index for any input color space pixel dimension value that falls between two boundary point indices.

33. The computer program product of claim 29, wherein the program code to determine if one or more of the selected boundary point indices is to be adjusted comprises:
program code to determine a perturbation threshold value for each input color space dimension independent of an input color space dimension value; and
program code to determine if boundary point perturbation is to be applied using the perturbation threshold value in association with a boundary point perturbation index.

34. The computer program product of claim 33, wherein the program code to determine a perturbation threshold value for each input color space dimension independent of an input color space dimension value uses a pixel location of the N-dimensional input color space pixel information to determine the perturbation threshold value.

35. The computer program product of claim 33, wherein the program code to determine if boundary point perturbation is to be applied using the perturbation threshold value in association with a boundary pint perturbation index comprises:
program code to compare the perturbation threshold value for an input color space dimension to boundary point offset information provided by the boundary point perturbation index.

36. The computer program product of claim 29, wherein the information based decision metrics comprise a statistically derived noise matrix to control a boundary point index perturbation alteration determination.

37. The computer program product of claim 36, wherein the noise matrix comprises a multi-dimensional matrix mapping pixel locations to information for control the boundary point index perturbation alteration determination.

38. The computer program product of claim 29, further comprising:
program code to generate a color look up table address from the boundary point indices, wherein the generated color look up table address maps to a particular boundary point in the color look up table providing output color space pixel information corresponding to the input color space pixel information.

39. The computer program product of claim 38, wherein the code to generate a color look up table address comprises:
code to determine if a boundary point constraint is to be implemented with respect to the boundary point indices; and
code to limit the particular boundary points in the color look up table for which the color look up table address may be generated.

* * * * *

UNITED STATES PATENT AND TRADEMARK OFFICE
CERTIFICATE OF CORRECTION

| | |
|---|---|
| PATENT NO. | : 8,542,915 B1 |
| APPLICATION NO. | : 13/163282 |
| DATED | : September 24, 2013 |
| INVENTOR(S) | : Fred Andree et al. |

It is certified that error appears in the above-identified patent and that said Letters Patent is hereby corrected as shown below:

In the Specification

At column 7, line number 15, delete "$index_n[hi]$" and replace with --$Index_n[hi]$--.

At column 8, line number 39, delete "nose" and replace with --noise--.

At column 8, line number 55, delete "$index_n[hi]$" and replace with --$Index_n[hi]$--.

At column 8, line number 65, delete "$index_n[hi]$" and replace with --$Index_n[hi]$--.

At column 11, line number 2, delete "RGB_perturbationmatrix[y][x]" and replace with --RGB_perturbation_matrix[y][x]--.

Signed and Sealed this
Tenth Day of December, 2013

Margaret A. Focarino
*Commissioner for Patents of the United States Patent and Trademark Office*